United States Patent [19]

Pennings et al.

[11] 4,200,722

[45] Apr. 29, 1980

[54] RUBBER-LIKE COPOLYMERS OF ETHYLENE, AT LEAST ONE OTHER α-ALKENE AND ONE OR MORE POLYENES POSSESSING INCREASED BUILDING TACK

[75] Inventors: Albertus J. Pennings, Norg; Arnold Vossebeld, Beek, both of Netherlands

[73] Assignee: Stamicarbon, B.V., Geleen, Netherlands

[21] Appl. No.: 743,339

[22] Filed: Nov. 19, 1976

Related U.S. Application Data

[63] Continuation of Ser. No. 411,402, Oct. 31, 1973, abandoned, which is a continuation-in-part of Ser. No. 381,091, Jul. 20, 1973, abandoned, which is a continuation of Ser. No. 291,163, Sep. 22, 1972, abandoned.

[30] Foreign Application Priority Data

Sep. 24, 1971 [NL] Netherlands .................. 7113143
Sep. 24, 1971 [NL] Netherlands .................. 7113144

[51] Int. Cl.² .................. C08F 210/18; C08F 232/06; C08F 236/00
[52] U.S. Cl. ................................. 526/282; 526/281; 526/283; 526/308; 526/336; 526/339
[58] Field of Search ....................... 526/281, 282, 283; 260/4

[56] References Cited

U.S. PATENT DOCUMENTS

| | | | |
|---|---|---|---|
| 3,063,973 | 11/1962 | Gladding et al. | 526/282 |
| 3,379,701 | 4/1968 | Gladding et al. | 526/282 |
| 3,658,770 | 4/1972 | Longi et al. | 526/282 |
| 3,671,506 | 6/1972 | Oshima et al. | 526/282 |
| 3,681,309 | 8/1972 | Makowski et al. | 526/282 |
| 3,684,782 | 8/1972 | Longi et al. | 526/282 |
| 3,705,138 | 12/1972 | van den Berg | 526/282 |

OTHER PUBLICATIONS

Brennan et al., Chem. Abstracts, 147, 163s, 1971.

*Primary Examiner*—Allan Lieberman
*Attorney, Agent, or Firm*—Cushman, Darby & Cushman

[57] ABSTRACT

Novel, rubbery copolymers of ethylene with at least one other α-alkene such as propylene, and a polyene such as 5-ethylidene norbornene-2, characterized by a differential scanning calorimetry thermogram maximum peak at a temperature between −7° and +11° C., are disclosed. These specific rubbery copolymers when one or more tackifiers are included therein, exhibit an unprecedentedly high tack and consequently provide for the first time EPDM-type compositions that have sufficient building tack for the manufacture of multi-ply articles such as tires.

11 Claims, No Drawings

RUBBER-LIKE COPOLYMERS OF ETHYLENE, AT LEAST ONE OTHER α-ALKENE AND ONE OR MORE POLYENES POSSESSING INCREASED BUILDING TACK

CROSS REFERENCE TO RELATED APPLICATIONS

This application is a continuation of our earlier application Ser. No. 411,402, filed Oct. 31, 1973, and now abandoned, which in turn was a continuation-in-part of application Ser. No. 381,091, filed July 20, 1973, and now abandoned, which in turn was a continuation of application Ser. No. 291,163, filed Sept. 22, 1972, and now abandoned.

BACKGROUND OF THE INVENTION

The invention relates to new rubbery copolymers of ethylene, at least one other α-alkene and, one or several polyenes, and compositions possessing increased building tack on the basis of such copolymers and tackifiers.

Rubbery copolymers of ethylene, at least one other α-alkene and one or more polymers, the so called EDPM rubbers, are of industrial importance and have excellent resistance to ozone, weathering and ageing. This combination of properties allows them to be used for a wide variety of purposes. However, they possess little or no building tack, that is as recognized in the art the capacity of a surface of the uncured rubber to adhere to a surface of a similarly uncured rubber. A sufficiently high building tack level is a prerequisite in the preparation of many rubber-based articles and particularly of a multi-ply structure, such as drive belts, conveyor belts and particularly automotive tires. A sufficiently high building tack provides a lasting strong bond between the various layers of the article during the building and curing stages.

To compensate for the lack of such tack in rubbery copolymers of ethylene, at least one other α-alkene and one or more polyenes, it has hitherto been the practice to apply an adhesive to all the rubber surfaces to be contacted, whereby they may be bonded together to form a layered structure. However, such a procedure is laborious, costly and generally not desirable for processes on an industrial scale. In addition, it presents a hazard due to the flammability of most of the organic solvents used in the the adhesive systems. Further, in order to produce an acceptable adhesive the proportions of natural rubber required to produce an adhesive mixture possessing adequate tack are so large that the resulting cured product is significantly lower in its resistance to the effects of ozone and of ageing. Moreover, the physical and mechanical properties of the final cured mixtures are considerably inferior to those of the individual polymers, and effective covulcanization of the polymers comprising the admixture cannot be effected in an expedient and direct manner.

A wide variety of tackifying resins, termed in the art as "tackifiers", have been developed, for example phenol/aldehyde condensation products and condensation products of acetylene, alkylated phenol resins, such as the material available under the trademark AMBEROL ST 140 X, phenolated isoprene resins and phenolated isoprene copolymer resins. An advantage of such resins is that they can be readily homogenized in the rubbery material itself and thus need not be applied as separate layers onto the rubber surfaces. However, the proportions of such tackifiers required in practice to provide a sufficient level of tack are, in general, so large as to adversely effect the properties of the cured product, so much so that the physical properties of such cured product are deteriorated to the point that they are no longer commercially acceptable. A further factor is that in such resins, when tackifiers are used in large proportions, the tackifiers are liable to migrate to the rubber surface, a phenomenon known as exudation. Thus in rolled or calandered rubbery copolymers the excessive exudation caused by large quantitites of tackifiers results in the risk that the desired tackifying effect initially achieved is completely lost during storage and may possibly result in an adverse effect. Furthermore, using a large amount of tackifier is expensive.

This experience, as outlined above, supported by a legion of experiments with a large variety of tackifiers and rubbery ethylene copolymers, has led the person skilled in the art to believe that it is not possible by admixing tackifiers to increase the tack of rubbery ethylene copolymers high enough to result in copolymer-tackifier compositions of sufficient building tack.

The present invention is directed to new rubbery copolymers of ethylene, at least one other α-alkene and one or more polyenes. In another embodiment of the compositions are disclosed containing such rubbery copolymers of ethylene and one or more tackifiers, which compositions possess sufficient building tack to be successfully used in the manufacture of a wide variety of articles, in particular in the manufacture of drive belts, conveyor belts and particularly automotive tires. As an additional advantage compositions according to the present invention are conveniently prepared in a simple and inexpensive manner, and exhibit an insignificant degree of exudation of the tackifier that is included in the composition.

DETAILED DESCRIPTION OF THE INVENTION

The present invention describes and discloses new rubbery copolymers of ethylene at least one other α-alkene and one or more polyenes, these rubbery copolymers being characterized by a thermogram recorded by differential scanning calorimetry at a cooling rate of 8° C. per minute and showing the heat of crystallisation as a function of the temperature, having a peak which passes through a maximum at a temperature between $-7°$ and $+11°$ C. preferably between $-3°$ and $+8°$ C., and most preferably between $0°$ and $+6°$ C.

We have found that if a tackifier is incorporated into such copolymers as described above, compositions are obtained having an unprecedentedly and hence unexpected high tack and this is certainly so compared with prior-teachings and considering what is known about copolymers of ethylene on the other hand when a tackifier is omitted, the copolymers according to the invention exhibit a low tack level, as low a 300 g/5 mm, in which they hardly differ from known copolymers of ethylene. The highly tacky compositions according to the present invention that are based on rubbery copolymers of ethylene at least one other α-alkene and one or several polyenes, and tackifiers, are characterized in that these compositions contain such new copolymers of ethylene as a rubbery copolymer of ethylene. These compositions exhibit an unprecedentedly high tack, contrary to the known compositions of copolymers of ethylene and tackifiers.

Copolymers used in the compositions of the invention preferably are characterized by the thermogram having a maximum peak at a temperature between −3° and +8° C. and preferably between 0° and 6° C. According to another preferred embodiment of the process according to the invention, the copolymer gives a thermogram in which at least half, and preferably two-thirds, of the area under the peak is between −7° and +11° C.

The new rubber-like copolymers of ethylene, at least one other α-alkene and one or several polyenes, hereinafter referred to by the term "rubber-like ethylene copolymers", upon examination by differential scanning calorimetry at a cooling rate of 8° C./min, give a thermogram in which the crystallization heat versus temperature curve passes through a maximum at a temperature between −7° and +11° C.

The occurrence of a peak caused by a heat effect at a given temperature in a thermogram recorded by differential scanning calorimetry (a d.s.c. curve) indicates that at that temperature a phase change takes place in the test material. If the d.s.c. curves of the rubbery ethylene copolymers are plotted for heated samples which are cooled down, the peaks in the thermogram indicate a transition from a molten to a crystalline phase in the said copolymers, and, hence to the existence of crystallites in the ethylene copolymers examined.

X-ray diffraction patterns of the new rubbery ethylene copolymers examined by applicant have revealed that the crystallites in ethylene propylene copolymers are composed of ethylene sequences. Reflections due to propylene have not been observed.

The temperature at which the crystallisation peak appears in the d.s.c. curve for these copolymers is dependent on the length of the ethylene sequences and on the distribution of the ethylene-sequence lengths. Since according to the invention a high building tack in the compositions based on ethylene copolymers and tackifiers can only be achieved with those ethylene copolymers whose d.s.c. curve recorded during cooling at the rate of 8° C./min show a peak with a maximum between −7° and +11° C., preferably between −3° and +8° C., and most preferably between 0° and +6° C., it is understood that the occurrence of tack is associated most closely with the existence of ethylene sequences of a critical length in the copolymers. It is believed that the ethylene copolymers used contain a sufficiently large number of ethylene sequences with from 7 to 9 carbon atoms in the backbone to give a d.s.c. curve with a peak maximum between −7° and +11° C.

The lengths of the ethylene sequences occurring in ethylene copolymers depend, among other factors, on the concentration of the comonomers incorporated in the ethylene copolymer and on the way in which these comonomers are built into the copolymer.

The distribution of the comonomers in the ethylene copolymer differs with the type of catalyst system used in the copolymer preparation. For example, a change in catalyst system at a constant percentage of incorporated comonomer may product a significant change in the melting temperature of the crystallites present in the copolymer. The polymerisation conditions like pressure, temperature, polymerization time, type of solvent and stirring intensity, also have an effect on the lengths of the ethylene sequences and their distribution in the copolymer. Thus, with any given catalyst system it is necessary to use specific combinations of polymerization conditions and degrees of comonomer incorporation to provide the new ethylene copolymers which can be used in the compositions according to the invention and which can provide higher tack levels than have hitherto been obtainable with rubbery polymers of the type used. The appropriate selection of reaction conditions adjusted to the reactants and catalyst employed is quickly made by the skilled operator.

It will be clear from the foregoing that the preparation of the new ethylene copolymers cannot be based solely on the degree of comonomer incorporation and the type of catalyst system used, but the polymerization conditions that determine the ethylene sequence lengths that may exist in the ethylene copolymer formed are also to be taken into account.

We have not been able to establish a relationship of various important polymerisation parameters in some way or other to the location of the crystallization peak in the d.s.c. curve and thus the length of the ethylene sequences. The following is a method of general applicability which will enable the person skilled in the art to prepare the new ethylene copolymers. More specific examples are also given below.

For any combination of catalyst system and polymerization conditions it can be determined in the following manner how the new ethylene copolymers according to the present invention can be prepared. With a given catalyst system and under selected polymerization conditions, a series of batch runs are carried out in which only the concentration of comonomers in the mixture of monomers to by polymerised, for example that of the α-alkeno, is varied and the d.s.c. curves of the ethylene copolymers thus obtained are then plotted. A change in the concentration of only one of the comonomers will change the length of the ethylene sequences and, hence, the temperature at which the crystallization peak in these curves attains its maximum. The content of comonomers incorporated in the said ethylene copolymer is then determined and the temperature at which the crystallization peak in the d.s.c. curve passes through its maximum is plotted versus the content of comonomer incorporated into the ethylene copolymer. This procedure gives a relationship between the temperature at which crystallite formation takes place in the ethylene copolymer and the content of incorporated comonomer. The function thus obtained is continuous; the range that we have examined could, for practical purposes, be regarded as linear.

From the relationship described above, it can be seen at which concentration of comonomer incorporated under the reaction conditions and with the catalyst system selected the rubberlike copolymers of ethylene can be obtained which exhibit a crystallization peak in the d.s.c. curve within the desired area of temperatures.

The production of copolymers to meet the requirements of the invention with the predetermined content of comonomers is thus within the capability of a person skilled in the production of copolymers, taking into account, the foregoing information. Such a technique can be employed with nearly any catalyst system and under virtually any combination of polymerisation conditions. The ethylene copolymers according to the invention may, in general, be prepared by interpolymerizing a mixture of ethylene, at least one other α-alkene and, one or more polyenes, either as a solution in a halogen-containing or halogen-free solvent, or as a suspension, with the aid of a coordination catalyst. Said coordination catalyst may be a catalyst formed by combining a compound of a metal of the subgroups 4, 5, 6 and 8, of Mendeleev's Periodic System of Elements including thorium and uranium, the so-called heavy-metal component, with a metal, alloy, metal hydride, or metal compound of an element of the groups 1, 2, 3 or of the fourth main group of the said Periodic System, the so-called aluminum compound, if necessary in the presence of other substances like compounds with free electron pairs such as water, alcohols or oxygen, or Lewis bases.

A preferred catalyst system is formed by combining vanadium and/or titanium compounds that are soluble in the vehicle used e.g. vanadium trichloride and/or vanadium tetrachloride, with one or several preferably organic aluminum compounds, for example aluminium trialkyl, dialkyl aluminium monohalogenide and/or monoalkyl aluminium dihalogenide and dialkyl aluminium monohydride and/or monoalkyl aluminium dihalogenide and adialkyl aluminum monohydride. Preferably, aluminium alkyl compounds are employed having an alkyl group with 2 to 8 carbon atoms, and more preferably 2 to 5 carbon atoms.

Particularly very good results are obtained with the combination of vanadium oxytrichloride and monoethylaluminium dichloride, or with a mixture of monoethyl aluminium dichloride and diethylaluminium monochloride.

The ratio between the aluminium component and the heavy-metal component to be used in the process according to the invention may be varied within wide limits, for example between 2:1 and 500:1, preferably between 3:1 and 25:1. In a continuous process the catalyst components may be directly supplied to the polymerization zone as a solution in the vehicle.

The new ethylene copolymers which may be incorporated in the compositions according to the invention are derived of ethylene, at least one other α-alkene and one or more polyenes. As the α-alkene other than ethylene preference is given to those α-alkenes which contain 3 to 18, and particularly 3 or 4 carbon atoms per molecule. Specific examples of such α-alkenes include propylene, butylene, pentylene, 4-methylpentylene, hexylene and heptylene. Mixtures of suitable α-alkenes, such as mixtures of propylene and butylene, can also be employed.

The new ethylene copolymers as described herein contain one or more polyenes. Examples of suitable polyenes include linear diones, with preferably 4 to 24 carbon atoms, and more preferably 4 to 12 carbon atoms per molecule, such as butadiene-1,3, hexadiene-1,4, hexadiene-1,5, octadiene-1,4 octadiene-1,5; cyclic polyenes with said preferably 6 to 24 carbon atoms, preferably 6 to 12 carbon atoms per molecule, such as for example cyclo-octadiene-1,4, cyclo-octadiene-1,5, and 5-methyl- and 6-methyl-4,7,8,9-tetrahydroindene; and further, cyclic dienes having a carbon bridge with preferably 7 to 24 and more preferably 8–18 carbon atoms per molecule, such as 5-methylnorbornene-2, 5-ethylidene norbornene-2, 5-vinylnorbornene-2, dicyclopentadiene, 5-isobutylidene norbornene-2 and 5-(2-methyl-2-butenyl)norbornene-2. Among these compounds we prefer 5-ethylidene norbornene-2.

The amount of polyene present in the copolymers according to the invention is preferably from 0.1 to 10% by weight.

The copolymerization reaction for the preparation of the new ethylene copolymers according to the invention is normally carried out at a temperature of between −40° and 120°, preferably between −20° and 80° C. The pressure will normally be 1–50 atmospheres, but higher or lower pressure may also be employed. The process is normally carried out in a continuous manner. The vehicle may be any liquid which is inert towards the catalyst used and contains preferably 4 to 18 carbon atoms per molecule. Examples of suitable hydrocarbons include saturated aliphatic hydrocarbons, such as butane, pentane, hexane, heptane or petroleum fractions aromatic hydrocarbons such as toluene, and benzene and halogenated organic hydrocarbons as tetrachloroethylene for example.

The temperature and pressure may advantageously so be chosen that one or several of the monomers used, notably the α-alkene, such as propylene, is present in liquid form and in so large a quantity that it will act as a vehicle. Another vehicle need not be used then.

The molecular weight of the copolymers to be prepared may, generally, be influenced by means of chain regulators, such as acetylene, hydrogen, butadiene-1,2, zinc alkyls and alkyl halogenides. Preferably, hydrogen will be used as the chain regulator.

In addition to the new ethylene copolymers described herein, the compositions according to the present invention should also contain one or more tackifiers. Any compound which, upon addition to the ethylene copolymers, increases the building task thereof is suitable for use as a tackifier in compositions according to the invention. Examples of suitable tackifiers include condensation products of phenols and aldehydes, condensation produces of phenols and acteylene and alkylated phenol resins. Good results are achieved with an alkylated phenol resin marketed under the trademark "Ambersol St 140 X".

The amount of tackifier to be used in compositions according to the invention is preferably between 0.1 and 25%-wt and particularly between 1 and 10%-wt, based on the amount of copolymer.

The compositions according to the invention may further contain one or more curing agents. Suitable curing agents include sulphur and peroxides. The amount of curing agent that may included in the compositions according to the invention may vary within wide limits. The amounts normally employed lie between 0.5 and 5%-wt relative to the amount of ethylene copolymer in the composition. Preference, however, is given to quantities between 0,5 and 2%-wt. In addition to curing agent the compositions according to the invention may also contain one or more curing accelerators, e.g. zinc diethyl carbamate, tetramethyl thiurmadisulphide, 2-mercaptobenzthiazole and activators, for example diethylene glycol.

The compositions according to the invention may further contain the fillers and pigments conventionally employed in the rubber compounding art. Examples of fillers and pigments include carbon black, finely divided silica, precipitated whiting, precipitated aluminum silicate, magnesium silicate, titanium dioxide and kaolin. Such compounds may be used in amounts of from 10% to 500%-wt, and particular from 25% to 250%-wt based on the copolymer.

The compositions according to the invention may also contain oils, e.g. nephthenic, paraffinic or aromatic oils. Aromatic oils are preferred as with such oils the highest building tack is achieved. The amounts of the oils used in the compositions according to the invention is preferably between 10% and 200%-wt based on the copolymer.

The task values hereinafter set forth were measured by a method using a tackmeter developed by DSM and described in SGF publ. no. 35: "News on EPDM and General Information of Rubber Technology," which method is as follows.

Strips of specific shape are fabricated by means of a small piston extruder equipped with an electrically cylinder heated to 100° C. The strips are stored for 24 hours under dust-controlled conditions at room temperature. After this period, one strip is coiled on a roller on which a piece of of adhesive plastics tape is applied the sticky surface of which is directed away from the roller surface. A second strip is then applied and pressed down firmly on the first strip. The roller carrying the strips is rotated at a constant peripheral speed of about 170 mm/min through one complete revolution, during which the strips are passed together under a constant load of 1500 g by means of a freely rotating roller of said weight.

After the strips have been pressed together during one complete revolution of the first roller, the pressure roller is removed. The second strip is then held in place by the tack only. The width of the surface of contact between the first strip and the second is 5 mm. After the second strip has been applied and pressed down, it is connected at one end to a drawbench and the force needed for stripping the second strip from the first strip measured at room temperature.

To prevent elongation of the uncured second rubber strip which is connected to the drawbench, a piece of adhesive plastics tape is applied on said second strip and its clamped-in end. The sticky surface of this piece of adhesive plastics tape is directed toward the rubber surface.

The rate at which the strips are drawn apart is 1 cm/min. The strip length over which the tack is measured is by itself 125 mm. D.s.c. curves as hereinbefore described are recorded with a differential scanning calorimeter marketed by Perkin Elmer under the Trade Mark PERKIN ELMER DSC 1 B, and refer to ethylene copolymer samples of about 24 mg weight, which prior to the test are heated to 100° C. The d.s.c. crystallisation thermogram is recorded at a cooling rate of 8° C. per minute.

Acceptable tack values are at least about 2,000 g/5 mm, and preferred tack values are of the order of 7,000 g/5 mm, all measured at 20° C.

For carrying out the measurements the temperature scale of the differential scanning calorimeter was calibrated by means of the following calibration agents: n-octane, norbornadiene, n-pentadecane, p-xylene, n-hexadecane, n-eicosane, n-tetracosane, pentaerythritoltetrastearate, n-octa pentacositane and indium. The melting-peak temperatures reached by heating these compounds at the rate of 8° C. per minute were set as equal to the equilibrium melting temperatures.

The following non-limiting examples will serve to further illustrate the present invention.

EXAMPLE 1

Preparation of ethylene-propylene-5-ethylidenenorbornene-2 copolymer

The rubbery copolymers of ethylene, propylene and polyene were prepared in one-liter glass reaction vessel equipped with a stirrer, a cooling mantle, feed and discharge apertures. The following compounds were dropped continuously into the reaction vessel all as solutions in n-hexane: Ethylaluminium sesquichloride, vanadium oxychloride and 5-ethylidenenorbornene-2. A gas mixture of ethylene, propylene and 6 vol. percent hydrogen was introduced continuously.

The concentrations in the reaction vessel were: ethylaluminium sesquichloride: 2.5 mmol/Liter, vanadium oxychloride: 0.25 mmol/Liter, and 5-ethylidenenorbornene-2: 15 mmol/Liter.

The reaction mixture, having a volume of 0.5 liter, was maintained at a temperature of 25° C. and a pressure of 1 atm. The solution formed of terpolymer in N-hexane (30 grams per liter) was continuously withdrawn from the reaction vessel. The terpolymers were isolated from the solution with hot water. They had an average content of 5 weight percent of 5-ethylidenenorbornene-2.

By varying the ethylene/propylene ratio in the introduced gas-mixture from about 1.1 to about 2.9, terpolymers were obtained with d.s.c. peak temperatures from −34° C. to +22° C. These d.s.c. peak temperatures were measured according to the method described above.

EXAMPLE 2

Ethylene-propylene-polyene tacky compositions

A series of compositions was prepared containing rubbery copolymers of ethylene, propylene and polyene, whose d.s.c. curves differ as regards the temperature pertaining to the peak maximum. The compositions were prepared on the basis of the following formulation:

| | |
|---|---|
| copolymer | 100 parts by weight |
| zinc oxide | 5 parts by weight |
| stearic acid | 1 part by weight |
| FEF carbon black | 50 parts by weight |
| aromatic oil* | 40 parts by weight |
| zinc butyl dithiocarbamate | 2 parts by weight |
| 2-mercapto benzthiazole | 0.5 parts by weight |
| tetramethyl thiuramdisulphide | 0.5 parts by weight |
| sulphur | 1.5 parts by weight |
| tackifier** | 5 parts by weight |

*Aromatic oil marketed by Sun Oil Co. under the Trade Mark SUNDEX 790. This oil has a density of 0.979, an aniline point of 117° F. and an aromatic content of 68.4%-wt.
**Tackifier obtained under the Trade Mark AMBEROL ST 140 X.

The copolymers were prepared in the manner of Example 1 as set out above.

The compositions were prepared by first adding the zinc oxide, stearic acid, carbon black and oil to the copolymer in an internal mixer at an increasing temperature, and subsequently admixing the curing agents, curing accelerators and tackifier on an open cold mill. Strips of the compositions were then prepared for testing in the manner herinbefore described and the tack of the strips was measured after they had been stored for 24 hours in a dust-controlled room at 20° C.

The tack-measuring procedure described above was applied to the test pieces, and the results obtained are set forth in Table 1.

Table 1

| Composition | Peak maximum in d.s.c. curve °C. | Tack at 20° C. g/5 mm |
|---|---|---|
| 1** | −34 | 880 |
| 2** | −31 | 960 |
| 3** | −29 | 940 |
| 4** | −25 | 1010 |
| 5** | −20 | 920 |

Table 1-continued

| Composition | Peak maximum in d.s.c. curve °C. | Tack at 20° C. g/5 mm |
| --- | --- | --- |
| 6** | −14 | 1080 |
| 7 | 0 | 2160 |
| 8 | 0 | 2650 |
| 9 | 0.5 | 4800 |
| 10 | 0.5 | 5400 |
| 11 | +2 | >5800* |
| 12 | +3.5 | >7000* |
| 13 | +4 | >7000* |
| 14 | +4 | >7000* |
| 15** | +14 | 670 |
| 16** | +17 | 490 |
| 17** | +19 | 520 |
| 18** | +22 | 480 |

*Exact values could not be determined because the rubber test strip detached from the tape during the measurement.
**Not according to the invention.

Compositions 1-6 and 15-18 were not according to the present invention in that the peak d.s.c. curve is outside the −7° to +11° C. range as provided and described herein. The above results indicate that, compared with compositions outside the present invention, the compositions according to the invention possess high to very high tack value.

Comparative Example

Based on the formulation given in the Example 2, a number of compositions were prepared of several commercially available rubbery copolymers of ethylene, propylene and one or more polyenes. The results obtained are set forth in Table 2.

Table 2

| Copolymers obtained under the Trade Mark | Peak temperature in d.s.c curve °C. | Tack at 20° C. g/5 mm |
| --- | --- | --- |
| DURTRAL TER 045 E | −43 | 140 |
| VISTALON 4608 | −25 | 280 |
| VISTALON 3708 | +33 | 80 |
| EPSYN 40 A | −50 | 100 |
| EPSYN 5508 | +25 | 40 |
| NORDEL 1145 | −21 | 120 |
| NORDEL 1440 | −25 | 160 |
| NORDEL 1635 | −16 | 60 |
| NORDEL 1070 | −25 | 100 |
| KELTAN 778 | +14 | 120 |
| KELTAN 312 | −24 | 460 |
| KELTAN 712 | −34 | 880 |

These results indicate that, on the basis of this series of commercially available ethylene copolymers whose d.s.c. curves show a peak maximum at a temperature above +11° C. or below −7° C., compositoins of relatively low tack value were obtained.

We claim:

1. A rubbery copolymer of 20 to 75 percent by weight of ethylene, about 24 to about 79 percent by weight of at least one other α-alkene having from 3 to 8 carbon atoms, and from about 0.1 to 10 percent by weight of one or more dienes, the total of said monomers amounting to 100 percent by weight, said rubbery copolymer having a thermogram recorded by differential scanning calorimetry (d.s.c.) at a cooling rate of 8° C. per minute and showing the heat of crystallization as a function of temperature having a peak which passes through a maximum at a temperature between −7° and +11° C.

2. The rubbery copolymer of claim 1 having a peak which passes through a maximum at a temperature between −3° and +8° C.

3. The rubbery copolymer of claim 1 having a peak which passes through a maximum at a temperature between 0° and 6° C.

4. The rubbery copolymer of claim 1 wherein said α-alkene is propylene, butylene-1 or mixtures thereof.

5. The rubbery copolymer of claim 1 wherein said diene present consists of 5-ethylidenenorbornene-2.

6. A rubbery copolymer of 20 to 75 percent by weight of ethylene, about 24 to about 79 percent by weight of propylene, and from about 0.1 to 10 percent by weight of 5-ethylidenenorbornene-2, the total of said monomers amounting to 100 percent by weight, said rubbery copolymer having a thermogram recorded by differential scanning calorimetry (d.s.c.) at a cooling rate of 8° C. per minute and showing the heat of crystallization as a function of temperature having a peak which passes through a maximum at a temperature between −7° and +11° C.

7. The rubbery copolymer of claim 6 having a peak which passes through a maximum at a temperature between −3° and +8° C.

8. The rubbery copolymer of claim 6 having a peak which passes through a maximum at a temperature between 0° and 6° C.

9. A rubbery copolymer of 20 to 75 percent by weight of ethylene, about 24 to about 79 percent by weight of propylene, and from about 0.1 to 10 percent by weight of 5-ethylidenenorbornene-2, the total of said monomers amounting to 100 percent by weight, said rubbery copolymer having a thermogram recorded by differential scanning calorimetry (d.s.c.) at a cooling rate of 8° C. per minute and showing the heat of crystallization as a function of temperature having a peak which passes through a maximum at a temperature between −7° and +11° C., and characterized by ethylene sequences of from about 7 to about 9 carbon atoms in the backbone of said rubbery copolymer.

10. The rubbery copolymer of claim 9 having a peak which passes through a maximum at a temperature between −3° and +8° C.

11. The rubbery copolymer of claim 9 having a peak which passes through a maximum at a temperature between 0° and 6° C.

* * * * *